United States Patent Office 3,218,316
Patented Nov. 16, 1965

3,218,316
10β-ETHYNYL-19-NORANDROSTANE
DERIVATIVES
John Edwards, Mexico City, Mexico, assignor to Syntex
Corporation, Panama, Panama, a corporation of
Panama
No Drawing. Filed Aug. 26, 1963, Ser. No. 304,682
20 Claims. (Cl. 260—239.5)

The present invention relates to novel cyclopentanophenanthrene derivatives and to a process for the production thereof.

More particularly the present invention relates to novel 10-ethinyl-19-nor-androstanes.

The novel compounds of the present invention are represented by the following formulae:

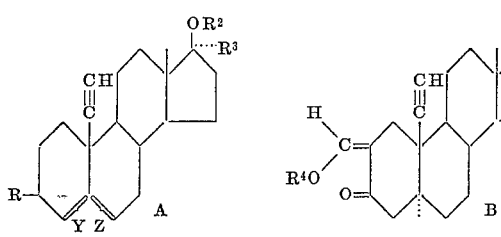

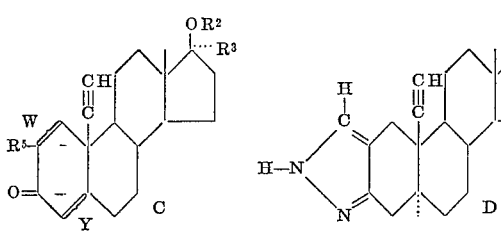

In the above formulae R represents hydrogen, β-hydroxyl or a β-hydrocarbon carboxylic acyloxy group of less than 12-carbon atoms; $R^2$ and $R^4$ each represent hydrogen or a hydrocarbon carboxylic acyl group of less than 12 carbon atoms; $R^3$ represents hydrogen, lower alkyl, lower alkenyl or lower alkinyl; $R^5$ represents hydrogen or methyl; Y represents a double bond or a saturated linkage, each between C–4 and C–5; W represents a double bond or a saturated linkage, each between C–1 and C–2; Z represents a double bond or saturated linkage, each between C–5 and C–6 and when Y is a double bond and Z is a saturated linkage, R is preferably hydrogen.

The acyl and acyloxy groups are derived from hydrocarbon carboxylic acids containing less than 12 carbon atoms which may be saturated or unsaturated, of straight, branched, cyclic or cyclicaliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae are anabolic- androgenic agents with a favorable androgenic ratio. In addition they have anti-estrogenic, anti-gonadotrophic, anti- fibrillatory and appetite stimulating properties.

Furthermore, they lower the blood cholesterol level, relieve premenstrual tension and suppress the output of the pituitary gland.

The novel compounds of the present invention are pre- pared by the process illustrated by the following scheme:

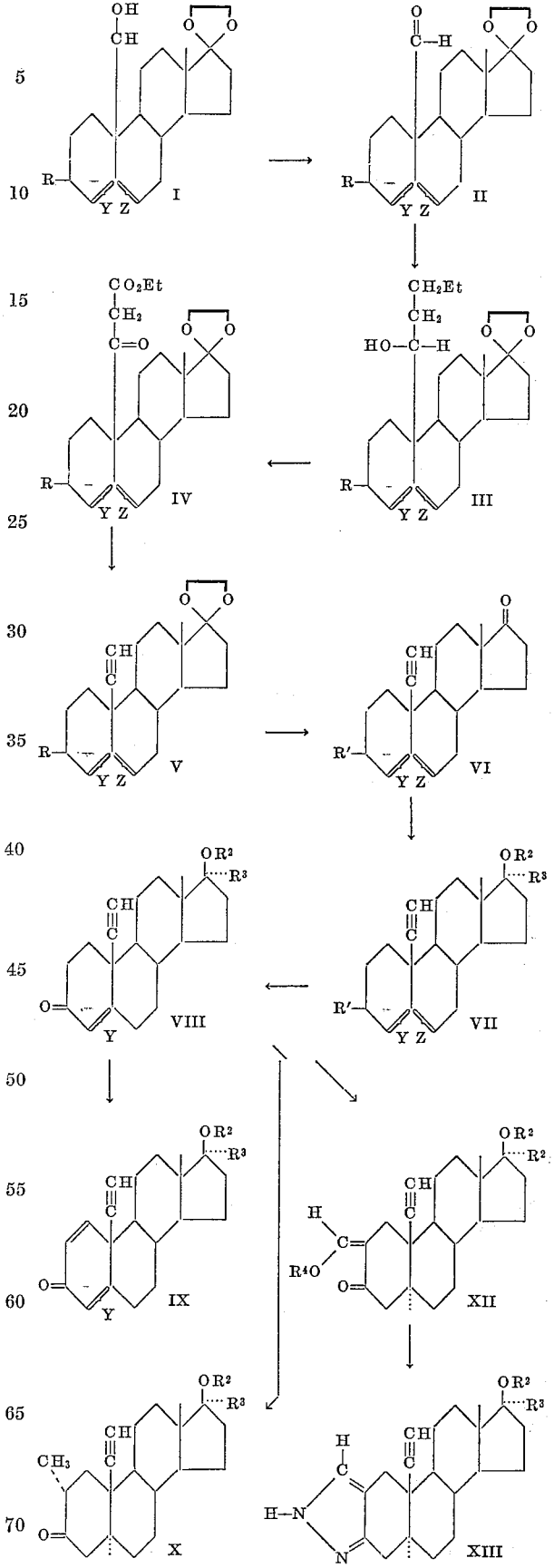

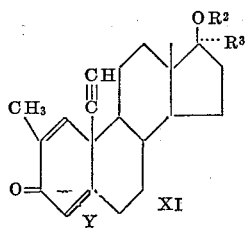

In the above formulae R, $R^2$, $R^3$, $R^4$, Y and Z have the same meaning as set forth hereinbefore; $R^1$ represents hydrogen, β-acyloxy, β-hydroxy or β-tetrahydropyranyloxy.

In practicing the process outlined above, the starting compound (I), which may be a 3-acylate of 17-cycloethylenedioxy-Δ⁵-androstene-3β,19-diol, a 3-acylate of 17-cycloethylenedioxy-androstane-3β,19 - diol or 17 - cycloethylenedioxy-Δ⁴-androsten-19-ol, is oxidized, preferably with chromium trioxide in pyridine under conventional conditions to give the corresponding 17-cycloethylenedioxy-19-aldehyde (II), which upon treatment with approximately 5 molar equivalents of ethyl bromoacetate in the presence of zinc, preferably in benzene, at reflux temperature of a period of time of the order of 18 hours yields the corresponding 17-cycloethylenedioxy-19-(ethoxycarbonyl-methyl)androstan-19-ol derivative (III). The latter derivative is oxidized conventionally with chromium trioxide in pyridine, to give the corresponding 17-cycloethylenedioxy-19-(ethoxycarbonyl methyl)-androstan-19-one (IV) which upon treatment with phosphorus pentachloride in carbon tetrachloride yields the corresponding 17 - cycloethylenedioxy-19-(ethoxycarbonyl-methylene)-19 - chloroderivative. The 17 - cycloethylenedioxy - 19-(ethoxycarbonyl-methyl) androstan-19-one derivative (IV) upon treatment with tosyl chloride in pyridine at steam bath temperature yields the corresponding 17-cycloethylenedioxy - 19 - (ethoxycarbonyl - methylene)-19-tosyloxy androstane derivative. The latter 19-tosyloxy compound as well as the aforesaid 19-chloro derivative, upon treatment with a strong base, such as a concentrated solution of potassium hydroxide, preferably at reflux temperature, for a period of time of the order of 10 hours, furnish an identical compound, namely the corresponding 17 - cycloethylenedioxy-10β-ethinyl-19-nor-androstan derivative (V), which upon conventional acid hydrolysis, e.g., with dilute sulfuric acid yields the corresponding 10β-ethinyl-19-norandrostan-17-one (VI). Treatment of the latter ketone with a lower (alkyl, alkenyl or alkinyl) magnesium halide, such as methyl, vinyl or ethinyl magnesium bromide, under conventional conditions yields the corresponding 10β-ethinyl-17α-lower (alkyl, alkenyl or alkinyl-19-norandrostan-17β-ol (VII; $R^3$ ≠H). In the latter reaction there occurs a concurrent hydrolysis of all acyloxy groups present in the molecule. The above 10β-ethinyl-19-nor-androstan-17-one gives the corresponding 17β-alcohol (VII; $R^3$=H) by conventional reduction, e.g., with sodium borohydride. If there is present in the molecule of the above 17-ketone a 3β-hydroxyl group in order to produce the corresponding 17β-acyloxy-3β-free hydroxy compound it becomes necessary to treat the 3β-hydroxy-17-keto-10β-ethinyl compound with dihydropyrane in the presence of p-toluenesulfonic acid to form the corresponding 3-tetrahydropyranylether, conventionally reduce the 17-keto group, e.g., with sodium borohydride, to give the 3-tetrahydropyranylether of the 3β,17β-diol, and conventionally esterify the 17β-hydroxyl group to produce the corresponding 3-tetrahydropyranyl ether-17-acylate, which upon conventional acid hydrolysis yields the corresponding 17-acylate of 10β-ethinyl-19-norandrostane-3β,17β-diol (VII; $R^1$=OH, $R^2$=acyl, $R^3$=H).

The latter 17-monoacylates and the free 3β,17β-dihydroxy-17α-substituted compound (VII; $R^1$=OH, $R^2$=H, $R^3$≠H)

upon conventional Oppenauer oxidation yield the corresponding 3-ketones (VIII) wherein the Δ⁵-double bond, if present in the parent compound, is shifted to the Δ⁴-position. The latter ketones (VIII) are treated with approximately 1 molar equivalent of 2,3-dichloro-5,6-dicyano-1,4-benzoquinone, preferably in dioxane, at reflux temperature for about 10 hours, thus giving the corresponding Δ¹-dehydro derivatives (IX).

The 4,5-saturated 10β-ethinyl-19-nor-androstan-3-ones (VIII; Y=saturated linkage) upon treatment with ethyl oxalate in the presence of sodium hydride preferably in benzene solution, followed consecutively by hydrochloric acid hydrolysis, treatment with methyl iodide in the presence of potassium carbonate, and reaction with sodium ethoxide for approximately 48 hours, afford the corresponding 2α-methyl derivatives (X) which, in turn, are dehydrogenated to the corresponding Δ¹-dehydro derivatives (XI; Y=saturated linkage) by treatment with approximately one molar equivalent of 2,3-dichloro-5,6-dicyano-1,4-benzoquinone, or to the corresponding Δ¹,⁴-dehydro compounds (XI; Y=double bond) by reaction with approximately two molar equivalents of the latter reagent, both reactions taking place under the same conditions as described hereinbefore.

Upon treatment of the 4,5-saturated-10β-ethinyl-19-norandrostan-3-one compounds (VIII; Y=saturated linkage) with ethyl formate in the presence of sodium hydride, preferably in benzene, at room temperature for about 24 hours and thereafter with a mineral acid, e.g., hydrochloric acid, there is produced the corresponding 2-hydroxymethylene-compounds (XII; $R^4$=H), which upon treatment with hydrazine hydrate, preferably in methanol solution, afford the corresponding pyrazolo (4', 3'; 2,3-androstane compounds (XIII).

The compounds of the present invention having a secondary group or a hydroxymethylene group, are conventionally acylated in pyridine with an acylating agent, such as an anhydride or a chloride of a hydrocarbon carboxylic acid of the type described thereinbefore, to give the corresponding acylates.

The compounds of the present invention having in the molecule a tertiary hydroxyl group, for example at C–17, are conventionally esterified in the presence of p-toluenesulfonic acid with an acylating agent, such as acetic anhydride, caproic anhydride, cyclopentylpropionic anhydride or enanthic anhydride, to produce the corresponding esters.

The compounds of the present invention having a secondary acyloxy group or an acyloxymethylene grouping are saponified by conventional treatment with a base to produce the corresponding free alcohols, which in turn, may be acylated conventionally in pyridine with an acylating agent to give the corresponding acylates, wherein the acyl group may be different from the previously saponified one.

The following specific examples serve to illustrate the present invention, but not intended to limit the scope thereof:

PREPARATION 1

A mixture of 5 g. of the 3-acetate of Δ⁵-androstene-3β,19-diol-17-one, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give the 3-acetate of 17-cycloethylenedioxy-$\Delta^5$-androstene-3$\beta$,19-diol.

PREPARATION 2

A suspension of 1 g. of the 3-acetate of 17-cycloethylenedioxy-$\Delta^5$-androstene-3$\beta$,19-diol in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 17-cycloethylenedioxy-$\Delta^5$-androstene-3$\beta$,19-diol.

A solution of 0.9 g. of the latter compound in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 15 minutes; 4 cc. of acetic acid were added and the solvents removed by stream distillation. The product was extracted several times with ethyl acetate and the organic extracts washed rapidly with 2% acetic acid solution, water, 10% sodium carbonate solution and water until neutral, dried over anhydrous sodium sulfate and evaporated to dryness. Crystallization from acetone-hexane afforded 17-cycloethylenedioxy-$\Delta^4$-androsten-19-ol-3-one.

PREPARATION 3

A solution of 1 g. of 17-cycloethylenedioxy-$\Delta^4$-androsten-19-ol-3-one in 50 cc. of tetrahydrofuran was added over a 30 minutes period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17-cycloethylenedioxy-$\Delta^4$-androstene-3$\beta$,19-diol.

A mixture of 1 g. of the latter compound 4 cc. of pyridine, and 1.1 molar equivalents of acetic anhydride was kept at room temperature overnight, poured into ice water, the formed precipitate was filtered, washed with water and dried. Crystallization from acetone-hexane gave the 3-acetate of 17-cycloethylenedioxy-$\Delta^4$-androstene-3$\beta$,19-diol.

A mixture of 0.5 g. of the latter steriod, 0.1 g. of lithium and 25 cc. of ethylamine were boiled under reflux for 12 hours. The reaction mixture was carefully diluted with water and the whole was extracted with methylene-chloride. The organic extracts were washed with water, 1% aqueous hydrochloric acid and water to neutral, then dried with anhydrous sodium sulfate and evaporated to dryness. The product was dissolved in hexane-benzene (1:1) and filtered through 20 g. of neutral alumina. Removal of the solvents and recrystallization from ether-hexane afforded 17-cycloethylendioxy-$\Delta^4$-androsten-19-ol.

PREPARATION 4

A solution of 0.5 g. of 17-cycloethylenedioxy-$\Delta^4$-androsten-19-ol-3-one in 20 cc. of dioxane-ether (1:1) was added in a steady stream to a solution of 0.15 g. of lithium in 25 cc. of liquid ammonia with good stirring. After 5 minutes, methanol was added dropwise until the blue color was discharged and the ammonia was then allowed to evaporate. Isolation with ether gave a product which was absorbed from 50 cc of benzene onto 30 g. of alumina. Elution with benzene-ether yielded a product which upon recrystallization gave 17-cycloethylendioxy-androstane-3$\beta$,19-diol.

A mixture of the latter product 4 cc. of pyridine and 1.1 molar equivalents of acetic anhydride was kept at room temperature overnight, poured into ice water, the formed precipitate was filtered, washed with water and dried. Crystallization from acetone-hexane gave the 3-acetate of 17-cycloethylenedioxy-androstane-3$\beta$,19-diol.

Example I

A solution of 6 g. of the 3-acetate of 17-cycloethylenedioxy-$\Delta^5$-androstene-3$\beta$,19-diol in 120 cc. of pyridine was added to a mixture of 6 g. of chromic trioxide in 120 cc. of pyridine. The reaction was kept at room temperature overnight. It was then diluted with ethyl acetate, filtered through celite and the filtrate washed well with water, dried and evaporated to dryness. Crystallization from acetone-hexane afforded the acetate of 17-cycloethylenedioxy-$\Delta^5$-androsten-3$\beta$-ol-19-al (Cpd. No. 1).

Example II

A mixture of 5 g. of compound No. 1, 3 g. of zinc metal, 5 molar equivalents of ethyl bromoacetate and 300 cc. of benzene was heated under reflux for 18 hours. Water was added, the organic phase separated, dried and evaporated to dryness. The residue was recrystallized from acetone thus giving the 3-acetate of 17-cycloethylenedioxy - 19-(ethoxycarbonyl-methyl)-$\Delta^5$-androstene-3$\beta$,19-diol (Cpd. No. 2).

Example III

The compound No. 2 was treated according to Example I thus giving the acetate of 17-cycloethylenedioxy-19-(ethoxycarbonyl - methyl)-$\Delta^5$-androsten-3$\beta$,-ol-19-one (Cpd. No. 3), which is in equilibrium with the enolic form thereof.

Example IV

A mixture of 4 g. of compound No. 3, 6 g. of phosphorous pentachloride and 60 cc. of carbon tetrachloride was refluxed for 1 hour in the absence of moisture. It was then cautiously poured into water. The organic layer was washed several times with water, dried over sodium sulfate and evaporated to dryness furnishing the acetate of 17 - cycloethylenedioxy - 19-(ethoxycarbonyl-methylene)-19-chloro-$\Delta^5$-androsten-3$\beta$-ol (Cpd. No. 4).

Example V

A solution of 1 g. of compound No. 4 in 100 cc. of methanol was refluxed for 10 hours under nitrogen atmosphere with 20 g. of potassium hydroxide; it was then poured into 1 liter of ice water, the precipitate collected, washed with water to neutral and dried, thus producing a crude compound which upon recrystallization from methylene-chloride-ether afforded 17-cycloethylenedioxy-10$\beta$-ethinyl-19-nor-$\Delta^5$-androsten-3$\beta$-ol (Cpd. No. 5).

Example VI 17-cycloethylenedioxy-$\Delta^4$-androsten-19-ol was treated consecutively in accordance with Examples I, II, III, IV, and V, thus giving respectively:

Cpd. No.:
(6) 17-cycloethylenedioxy-$\Delta^4$-androsten-19-al,
(7) 17-cycloethylenedioxy-19-(ethoxycarbonyl-methyl)-$\Delta^4$-androsten-19-ol,
(8) 17-cycloethylenedioxy-19-(ethoxycarbonyl-methyl)-$\Delta^4$-androsten-19-one,
(9) 17-cycloethylenedioxy-19-(ethoxycarbonyl-methylene)-19-chloro-$\Delta^4$-androstene,
(10) 17-cycloethylenedioxy-10$\beta$-ethinyl-19-nor-$\Delta^4$-androstene,

Example VII

The 3-acetate of 17-cycloethylenedioxy-androstane-3$\beta$,19-diol was treated successively according to Example I, II, III, IV and V, thus yielding respectively:

Cpd. No.:
(11) The acetate of 17-cycloethylenedioxy-androstan-3$\beta$-ol-19-al,
(12) The acetate of 17-cycloethylenedioxy-19-(ethoxycarbonyl-methyl)-androstane-3$\beta$,19-diol,

(13) The acetate of 17-cycloethylenedioxy-19-(ethoxycarbonyl-methyl)-androstan-3β-ol-19-one,
(14) The acetate of 17-cycloethylenedioxy-19-(ethoxycarbonyl-methylene)-19-chloro-androstan-3β-ol,
(15) The acetate of 17-cycloethylenedioxy-10β-ethinyl-19-nor-androstan-3β-ol.

Example VIII

A solution of 1 g. of compound No. 3 in 5 cc. of pyridine was treated with 0.5 g. of tosyl chloride and kept at steam bath temperature for 5 hours, it was then diluted with water and the precipitate separated by filtration, thus giving the 3-acetate of 17-cycloethylenedioxy-19-(ethoxycarbonyl - methylene) - 19 - tosyloxy - Δ⁵ - androsten-3β-ol (Cpd. No. 16).

Upon treatment of the latter compound by the procedure described in Example V there was obtained a product identical with compound No. 5.

The compounds Nos. 8 and 13 were treated by the above procedures, thus affording respectively products identical with compound Nos. 10 and 15.

Example IX

A solution of 2.0 g. of compound No. 5 in 70 cc. of methanol and 7 ml. of 8% aqueous sulfuric acid was refluxed for 40 minutes. It was then neutralized with saturated sodium carbonate solution, concentrated to ca. 20 ml. in vacuo and poured into water. The formed precipitate was filtered off and washed thoroughly with water. Recrystallization from acetone gave 10β-ethinyl-19-nor-Δ⁵-androsten-3β-ol-17-one (Cpd. No. 17).

The compounds Nos. 10 and 15 were treated by the above procedure, thus giving respectively: 10β-ethinyl-19-nor-Δ⁴-androsten-17-one (Cpd. No. 18) and 10β-ethinyl-19-nor-androstan-3β-ol-17-one (Cpd. No. 19).

Example X

A solution of 5 g. of compound No. 17 in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α - methyl - 10β-ethinyl-19-nor-Δ⁵-androstene-3β,17β-diol (Cpd. No. 20).

The compounds Nos. 18 and 19 were treated by the above procedure, thus yielding respectively 17α-methyl-10β-ethinyl-19-nor-Δ⁴-androsten-17β-ol (Cpd. No. 21), 17α - methyl - 10β - ethinyl-19-nor-androstane-3β,17β-diol (Cpd. No. 22).

Example XI

The compounds Nos. 17, 18 and 19, were treated according to Example X except that vinyl magnesium bromide, was used instead of methyl magnesium bromide thus yielding respectively:

Cpd. No.:
(23) 17α - vinyl - 10β - ethinyl-19-nor-Δ⁵-androstene-3β,17β-diol,
(24) 17α - vinyl - 10β-ethinyl-19-nor-Δ⁴-androsten-17β-ol,
(25) 17α - vinyl - 10β - ethinyl-19-nor-androstane-3β,17β-diol.

Example XII

The compounds Nos. 17, 18 and 19 were treated in accordance with Example X except that methyl magnesium bromide was substituted by ethinyl magnesium bromide thus giving respectively:

Cpd. No.:
(26) 10β,17α - diethinyl - 19 - nor-Δ⁵-androstene-3β,17β-diol,
(27) 10β,17α - diethinyl - 19 - nor - Δ⁴ - androsten-17β-ol,
(28) 10β,17α - diethinyl - 19-nor-androstane-3β,17β-diol.

Example XIII 2 cc. of dihydropyrane were added to a solution of 1 g. of compound No. 17 in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 10β-ethinyl-19-nor-Δ⁵-androsten-3β-ol-17-one (Cpd. No. 29).

Example XIV

A solution of 1 g. of sodium borohydride in 3 cc. of water was added to an ice-cooled solution of 1 g. of compound No. 29 in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give the 3-tetrahydropyranylether of 10β - ethinyl - 19-nor-Δ⁵-androstene-3β,17β-diol (Cpd. No. 30).

Example XV

A mixture of 1 g. of compound No. 30, 4 cc. of pyridine and 2 cc. of acetic anhydride was kept at room temperature overnight, poured into ice water, the formed precipitate was filtered, washed with water and dried. Crystallization from acetone-hexane gave the 3-tetrahydropyranylether - 17 - acetate of 10β-ethinyl-19-nor-Δ⁵-androstene-3β,17β-diol (Cpd. No. 31).

Example XVI

To a solution of 1 g. of compound No. 31 in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded the 17-acetate of 10β-ethinyl-19-nor-Δ⁵-androstene-3β,17β-diol (Cpd. No. 32).

Example XVII

The compound No. 19 was treated consecutively according to Examples XIII, XIV, XV, and XVI, thus giving respectively:

Cpd. No.:
(33) The 3-tetrahydropyranylether of 10β-ethinyl-19-nor-androstan-3β-ol-17-one,
(34) The 3-tetrahydropyranylether of 10β-ethinyl-19-nor-androstane-3β,17βdiol,
(35) The 3-tetrahydropyranylether 17-acetate of 10β-ethinyl-19-nor-androstane-3β,17β-diol,
(36) The 17-acetate of 10β-ethinyl-19-nor-androstane-3β,17β-diol.

Example XVIII

A solution of 1 g. of compound No. 32 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness.

Crystallization from acetone-hexane afforded the acetate of 10β-ethinyl-19-nor-Δ⁴-androsten-17β-ol-3-one (Cpd. No. 37).

The compounds Nos. 20, 22, 23, 25, 26, 28 and 36 were treated by the above procedure, giving respectively:

Cpd. No.:
(38) 17α-methyl-10β-ethinyl-19-nor-Δ⁴-androsten-17β-ol-3-one,
(39) 17α-methyl-10β-ethinyl-19-nor-androstan-17β-ol-3-one,
(40) 17α-vinyl-10β-ethinyl-19-nor-Δ⁴-androsten-17β-ol-3-one,
(41) 17α-vinyl-10β-ethinyl-19-nor-androstan-17β-ol-3-one,
(42) 10β,17α-diethinyl-19-nor-Δ⁴-androsten-17β-ol-3-one,
(43) 10β,17α-diethinyl-19-nor-androstan-17β-ol-3-one,
(44) The acetate of 10β-ethinyl-19-nor-androstan-17β-ol-3-one.

*Example XIX*

A mixture of 500 mg. of compound No. 37, 10 cc. of dioxane and 1.1 molar equivalents of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave the acetate of 10β-ethinyl-19-nor-Δ¹,⁴-androstadien-17β-ol-3-one (Cpd. No. 45).

The compounds Nos. 38 to 44, inclusive, were treated by the above procedure, thus yielding respectively:

Cpd. No.:
(46) 17α-methyl-10β-ethinyl-19-nor-Δ¹,⁴-androstadien-17β-ol-3-one,
(47) 17α-methyl-10β-ethinyl-19-nor-Δ¹-androsten-17β-ol-3-one,
(48) 17α-vinyl-10β-ethinyl-19-nor-Δ¹,⁴-androstadien-17β-ol-3-one,
(49) 17α-vinyl-10β-ethinyl-19-nor-Δ¹-androsten-17β-ol-3-one,
(50) 10β,17α-diethinyl-19-nor-Δ¹,⁴-androstadien-17β-ol-3-one,
(51) 10β,17α-diethinyl-19-nor-Δ¹-androsten-17β-ol-3-one,
(52) The acetate of 10β-ethinyl-19-nor-Δ¹-androsten-17β-ol-3-one.

*Example XX*

In a nitrogen atmosphere, a mixture of 1 g. of compound No. 39 in 20 cc. of anhydrous thiophene-free benzene, 1 cc. of ethyl oxalate and 0.3 g. of sodium hydride was stirred for 4 hours. The precipitated sodium salt of the 2-ethoxyoxolate and the excess sodium hydride were filtered off, washed with benzene, then hexane, and dried for everal hours in vacuo. The product was cautiously added in portions to a stirred ice-cold hydrochloric acid solution (2 cc. of 35% acid in 40 cc. of ice water), liberating the free ethoxyoxolate which was extracted with methylene dichloride. The extract was washed with water, dried and evaporated. The residue was taken up in 15 cc. of acetone, 1 g. of finely powdered anhydrous potassium carbonate and 3 cc. of methyl iodide were added and the mixture boiled under reflux for 48 hours. The filtered solution was evaporated almost to dryness, water added, the residue extracted with methylene chloride and the extract washed with 1% sodium hydroxide, water, dried and evaporated to dryness. The residue was dried at 90° C. for 2 hours in vacuo and then treated with the solution of sodium ethoxide prepared from 0.1 g. of sodium and 10 cc. of absolute ethanol. The solution was allowed to stand for 48 hours at room temperature and then poured into 100 cc. of water. Without neutralization the mixture was extracted with methylene dichloride (occasionally emulsions formed during extraction and it was necessary to add salt) the organic extract was washed with water to neutrality, dried and evaporated. The residue was taken up in benzene and chromatographed on 40 g. of ethyl acetate washed alumina. Acetone-hexane crystallization of the benzene-ether fractions gave 2α,17α-dimethyl-10β-ethinyl-19-nor-androstan-17β-ol-3-one (Cpd. No. 53).

The compounds Nos. 41, 43, and 44 were treated by the above procedure, thus yielding respectively:

Cpd. No.:
(54) 2α-methyl-17α-vinyl-10β-ethinyl-19-nor-androstan-17β-ol-3-one,
(55) 2α-methyl-10β,17α-diethinyl-19-nor-androstan-17β-ol-3-one,
(56) 2α-methyl-10β-ethinyl-19-nor-androstan-17β-ol-3-one.

*Example XXI*

The compounds Nos. 53 to 56, inclusive, were treated according to Example XIX, thus yielding:

Cpd. No.:
(57) 2α,17α-dimethyl-10β-ethinyl-19-nor-Δ¹-androsten-17β-ol-3-one,
(58) 2α-methyl-17α-vinyl-10β-ethinyl-19-nor-Δ¹-androsten-17β-ol-3-one,
(59) 2α-methyl-10β,17α-diethinyl-19-nor-Δ¹-androsten-17β-ol-3-one,
(60) 2α-methyl-10β-ethinyl-19-nor-Δ¹-androsten-17β-ol-3-one.

*Example XXII*

Upon treatment of compounds Nos. 53 to 56, inclusive, by the procedure of Example XIX, except that there were used 2.2 molar equivalents of 2,3-dichloro-5,6-dicyano-1,4-benzoquinone, there were respectively obtained:

Cpd. No.:
(61) 2α,17α-dimethyl-10β-ethinyl-19-nor-Δ¹,⁴-androstadien-17β-ol-3-one,
(62) 2α-methyl-17α-vinyl-10β-ethinyl-19-nor-Δ¹,⁴-androstadien-17β-ol-3-one,
(63) 2α-methyl-10β,17α-diethinyl-19-nor-Δ¹,⁴-androstadien-17β-ol-3-one,
(64) 2α-methyl-10β-ethinyl-19-nor-Δ¹,⁴-androstadien-17β-ol-3-one.

*Example XXIII*

To a solution of 3 g. of compound No. 39 in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and stirred at room temperature for half hour. The precipitate was collected, washed with water and dried. Recrystallization from methylene-chloride-hexane gave 2-hydroxymethylene-17α-methyl-10β-ethinyl-19-nor-androstan-17β-ol-3-one (Cpd. No. 65).

The compounds Nos. 41, 43, and 44 were treated by the above procedure, thus yielding respectively:

Cpd. No.:
(66) 2-hydroxymethylene-17α-vinyl-10β-ethinyl-19-nor-androstan-17β-ol-3-one,
(67) 2-hydroxymethylene-10β,17α-diethinyl-19-nor-androstan-17β-ol-3-one,
(68) 2-hydroxymethylene-10β-ethinyl-19-nor-androstan-17β-ol-3-one.

*Example XXIV*

A mixture of 1 g. of compound No. 65, 1 g. of hydrazine hydrate and 50 cc. of methanol was boiled under reflux for 15 minutes, then it was poured into cold water and filtered. The solid was recrystallized from acetone-hexane to give pyrazolo (4', 3'; 2,3)-17α-methyl-10β-ethinyl-19-nor-androstan-17β-ol (Cpd. No. 69).

The compounds Nos. 66, 67 and 68 were treated by the above procedure thus producing respectively:

Cpd. No.:
(70) pyrazolo (4', 3'; 2,3)-17α-vinyl-10β-ethinyl-19-nor-androstan-17β-ol-3-one,
(71) pyrazolo (4', 3'; 2,3)-10β,17α-diethinyl-19-nor androstan-17β-ol-3-one,
(72) pyrazolo (4', 3'; 2,3)-10β-ethinyl-19-nor-androstan-17β-ol-3-one.

*Example XXV*

The compound No. 18 was treated successively according to Examples XIV and XV, thus yielding respectively:

10β-ethinyl-19-nor-Δ⁴-androsten-17β-ol (Cpd. No. 73) and
10β-ethinyl-19-nor-Δ⁴-androsten-17β-ol acetate (Cpd. No. 74).

*Example XXVI*

A mixture of 1 g. of compound No. 56, 4 cc. of pyridine and 2 cc. of acetic anhydride was kept at room temperature overnight, poured into ice water, the formed precipitate was filtered, washed with water and dried. Crystallization from acetone-hexane gave the acetate of 2α-methyl-10β-ethinyl-19-nor-androstan-17β-ol-3-one (Cpd. No. 75).

The compounds Nos. 60, 64, 68, and 72, were treated by the above procedure, thus giving respectively:

Cpd. No.:
(76) The acetate of 2α-methyl-10β-ethinyl-19-nor-Δ¹-androsten-17β-ol-3-one,
(77) The acetate of 2α-methyl-10β-ethinyl-19-nor-Δ¹,⁴-androstadien-17β-ol-3-one,
(78) The acetate of 2-acetoxymethylene-10β-ethinyl-19-nor-androstan-17β-ol-3-one,
(79) The acetate of pyrazolo (4', 3'; 2,3)-10β-ethinyl-19-nor-androstan-17β-ol-3-one.

*Example XXVII*

The compounds Nos. 20, 22, 23, 25, 26, and 28 were treated according to the preceding example, thus giving respectively:

Cpd. No.:
(80) The 3-acetate of 17α-methyl-10β-ethinyl-19-nor-Δ⁵-androstene-3β,17β-diol,
(81) The 3-acetate of 17α-methyl-10β-ethinyl-19-nor-androstane-3β,17β-diol,
(82) The 3-acetate of 17α-vinyl-10β-ethinyl-19-nor-Δ⁵-androstene-3β,17β-diol-,
(83) The 3-acetate of 17α-vinyl-10β-ethinyl-19-nor-androstane-3β,17β-diol,
(84) The 3-acetate of 10β,17α-diethinyl-19-nor-Δ⁵-androstene-3β,17β-diol,
(85) The 3-acetate of 10β,17α-diethinyl-19-nor-androstane-3β,17β-diol.

*Example XXVIII*

The compounds Nos. 65, 66 and 67 were treated according to Example XXVI, thus furnishing respectively:

Cpd. No.:
(86) 2-acetoxymethylene-17α-methyl-10β-ethinyl-19-nor-androstan-17β-ol-3-one
(87) 2-acetoxymethylene-17α-vinyl-10β-ethinyl-19-nor-androstan-17β-ol-3-one
(88) 2-acetoxymethylene-10β,17α-diethinyl-19-nor-androstan-17β-ol-3-one.

*Example XXIX*

To a solution of 5 g. of compound No. 20 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α - methyl - 10β-ethinyl-19-nor-Δ⁵-androstene-3β,17β-diol dicaproate (Cpd. No. 89).

The compounds Nos. 21, 22, 23, 24, 25, 26, 27, 28, 38, 39, 46, 47, 53, 55, 57, 61, 65, and 69, were treated by the same procedure thus affording respectively:

Cpd. No.:
(90) 17α-methyl-10β-ethinyl-19-nor-Δ⁴-androsten-17β-ol-caproate,
(91) 17α-methyl-10β-ethinyl-19-nor-androstane-3β,17β-diol dicaproate,
(92) 17α-vinyl-10β-ethinyl-19-nor-Δ⁵-androstene-3β,17β-diol dicaproate,
(93) 17α-vinyl-10β-ethinyl-19-nor-Δ⁴-androsten-17β-ol caproate,
(94) 17α-vinyl-10β-ethinyl-19-nor-androstane-3β,17β-diol-dicaproate,
(95) 10β,17α-diethinyl-19-nor-Δ⁵-androstene-3β,17β-diol-dicaproate,
(96) 10β,17α-diethinyl-19-nor-Δ⁴-androsten-17β-ol caproate,
(97) 10β,17α-diethinyl-19-nor-androstane,3β,17β-diol dicaproate,
(98) 17α-methyl-10β-ethinyl-19-nor-Δ⁴-androsten-17β-ol-3-one caproate,
(99) 17α-methyl-10β-ethinyl-19-nor-androstan-17β-ol-3-one caproate,
(100) 17α-methyl-10β-ethinyl-19-nor-Δ¹,⁴-androstadien-17β-ol-3-one caproate,
(101) 17α-methyl-10β-ethinyl-19-nor-Δ¹-androsten-17β-ol-3-one caproate,
(102) 2α,17α-dimethyl-10β-ethinyl-19-nor-androstan-17β-ol-3-one caproate,
(103) 2α-methyl-17α-vinyl-10β-ethinyl-19-nor-androstan-17β-ol-3-one caproate,
(104) 2α,17α-dimethyl-10β-ethinyl-19-nor-Δ¹-androsten-17β-ol-3-one caproate,
(105) 2α,17α-dimethyl-10β-ethinyl-19-nor-Δ¹,⁴-androstadien-17β-ol-3-one caproate,
(106) 2-caproxymethylene-17α-methyl-10β-ethinyl-19-nor-androstan-17β-ol-3-one caproate,
(107) pyrazolo (4',3'; 2,3)-17α-methyl-10β-ethinyl-19-nor-androstan-17β-ol-3-one caproate.

*Example XXX*

The starting compounds of Example XXIX were treated according to that example, except that caproic anhydride was substituted by acetic, propionic, enanthic and undecenoic anhydrides, thus yielding respectively the corresponding acetates, propionates, enanthates and undecenoates.

*Example XXXI*

A suspension of 1 g. of compound No. 37 in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 10β-ethinyl-19-nor-Δ⁴-androsten-17β-ol-3-one (Cpd. No. 108).

The compounds Nos. 44, 45, 52, 89, 91, 94, and 106, were treated according to the above procedure, thus yielding respectively:

Cpd. No.:
(109) 10β-ethinyl-19-nor-androstan-17β-ol-3-one,
(110) 10β-ethinyl-19-nor-Δ¹,⁴-androstadien-17β-ol-3-one,
(111) 10β-ethinyl-19-nor-Δ¹-androsten-17β-ol-3-one
(112) 17α-methyl-10β-ethinyl-19-nor-Δ⁵-androstene-3β,17β-diol 17-caproate (113) 17α-methyl-10β-ethinyl-19-nor-androstane-3β,17β-diol 17-caproate (114) 17α-vinyl-10β-ethinyl-19-nor-androstane-3β,17β-diol 17-caproate (115) 2-hydroxymethylene-17α-methyl-10β-ethinyl-19-nor-androstan-17β-ol-3-one 17-caproate.

*Example XXXII*

Treatment of compounds Nos. 112, 113, and 114 according to Example XXVI yielded the corresponding 3-acetates-17-caproates.

I claim:

1. A compound of the following formula:

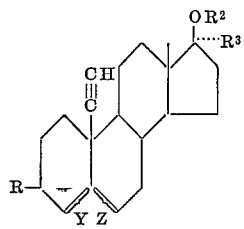

wherein R is selected from the group consisting of hydrogen, β-hydroxyl and a β-hydrocarbon carboxylic acyloxy group of less than 12 carbon atoms; $R^2$ is selected from the group consisting of hydrogen and a hydrocarbon carboxylic acyl group of less than 12 carbon atoms; $R^3$ is a member of the group consisting of hydrogen, lower alkyl, lower alkenyl and lower alkinyl; Y is selected from the group consisting of a double bond and a saturated linkage between C–4 and C–5, with Y representing a double bond when R is hydrogen, and Z is selected from the group consisting of a double bond and a saturated linkage between C–5 and C–6, with Z representing a saturated linkage when R is hydrogen.

2. 17α-methyl - 10β - ethinyl-19-nor-Δ$^5$-androstene-3β,17β-diol.

3. 17α-vinyl - 10β-ethinyl-19-nor-Δ$^5$-androstene-3β,17β-diol.

4. 10β,17α-diethinyl-19-nor-Δ$^5$-androstene-3β,17β-diol.

5. 17α-methyl-10β-ethinyl-19-nor-Δ$^4$-androsten-17β-ol.

6. 17α-vinyl-10β-ethinyl-19-nor-Δ$^4$-androsten-17β-ol.

7. 10β,17α-diethinyl-19-nor-Δ$^4$-androsten-17β-ol.

8. 17α-methyl - 10β - ethinyl-19-nor-androstane-3β,17β-diol.

9. 17α-vinyl-10β-ethinyl - 19 - nor - androstane-3β,17β-diol.

10. 10β,17α-diethinyl-19-nor-androstane-3β,17β-diol.

11. A compound of the following formula:

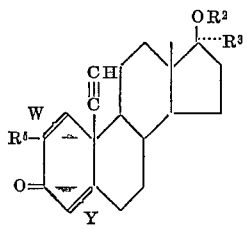

wherein $R^2$ is selected from the group consisting of hydrogen and a hydrocarbon carboxylic acyl group of less than 12 carbon atoms; $R^3$ is selected from the group consisting of hydrogen, lower alkyl, lower alkenyl and lower alkinyl; $R^5$ is a member of the group consisting of hydrogen and methyl; Y is a member of the group consisting of a double bond and a saturated linkage between C–4 and C–5, and W is a member of the group consisting of a double bond and a saturated linkage between C–1 and C–2.

12. The 17-acetate of 10β-ethinyl-19-nor-androstan-17β-ol-3-one.

13. 17α-methyl-10β-ethinyl - 19 - nor-androstan-17β-ol-3-one.

14. 17α - vinyl - 10β - ethinyl-19-nor-androstan-17β-ol-3-one.

15. 10β-17α-diethinyl-19-nor-androstan-17β-ol-3-one.

16. 10β-ethinyl-19-nor-Δ$^5$-androsten-3β-ol-17-one.

17. 10β-ethinyl-19-nor-Δ$^4$-androsten-17-one.

18. 10β-ethinyl-19-nor-androstan-3β-ol-17-one.

19. A compound of the following formula:

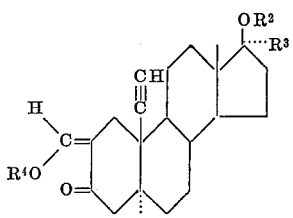

wherein $R^2$ and $R^4$ are selected from the group consisting of hydrogen and a hydrocarbon carboxylic acyl group of less than 12 carbon atoms, and $R^3$ is a member of the group consisting of hydrogen, lower alkyl, lower alkenyl and lower alkinyl.

20. A compound of the following formula:

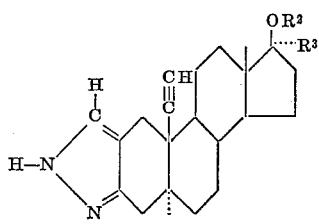

wherein $R^2$ is selected from the group consisting of hydrogen and a hydrocarbon carboxylic acyl group of less than 12 carbon atoms; and $R^3$ is selected from the group consisting of hydrogen, lower alkyl, lower alkenyl and lower alkinyl.

No references cited.

LEWIS GOTTS, *Primary Examiner.*